United States Patent [19]

Stanaback

[11] 4,052,548
[45] Oct. 4, 1977

[54] PROCESS FOR THE POLYMERIZATION OF VINYL HALIDES IN THE PRESENCE OF AN ALKYLENE BIS-(MERCAPTOALKANOATE)

[75] Inventor: Robert J. Stanaback, Gladstone, N.J.

[73] Assignee: Tenneco Chemicals, Inc., Saddle Brook, N.J.

[21] Appl. No.: 736,921

[22] Filed: Oct. 29, 1976

[51] Int. Cl.$^2$ .................................................. C08F 14/06
[52] U.S. Cl. ................................. 526/214; 526/330; 526/344; 526/345
[58] Field of Search ............... 526/345, 344, 214, 330

[56] References Cited

U.S. PATENT DOCUMENTS

| | | | |
|---|---|---|---|
| 2,497,107 | 2/1950 | Weber | 526/214 |
| 2,878,237 | 3/1959 | Russell et al. | 526/214 |
| 3,758,447 | 9/1973 | Falk et al. | 526/214 |
| 3,846,390 | 11/1974 | Ito et al. | 526/214 |

Primary Examiner—Harry Wong, Jr.
Attorney, Agent, or Firm—Evelyn Berlow

[57] ABSTRACT

Vinyl halide polymers of relatively low molecular weight result when a monomer component that comprises a vinyl halide is polymerized in the presence of a free radical generating polymerization initiator and a molecular weight regulating agent that is an alkylene bis-(mercaptoalkanoate), such as ethylene bis-(mercaptoacetate).

7 Claims, No Drawings

PROCESS FOR THE POLYMERIZATION OF VINYL HALIDES IN THE PRESENCE OF AN ALKYLENE BIS-(MERCAPTOALKANOATE)

This invention relates to a process for the production of vinyl halide polymers. More particularly, it relates to a process for the production of vinyl halide polymers having lower molecular weights and melt viscosities than the corresponding polymers prepared at the same temperatures but using previously known processes.

When vinyl chloride or another vinyl halide is polymerized in an aqueous medium in the presence of a free radical generating polymerization initiator, the products are usually high molecular weight polymers that have relatively high melt viscosities. These high molecular weight polymers have the disadvantage of being difficult to process without the use of special processing equipment except at temperatures that are so high that they have a detrimental effect on the color and other physical properties of the processed polymers.

Various techniques have been proposed for regulating the molecular weight of vinyl halide polymers so as to make them more easily processable. In one such technique, the polymerization is carried out in an organic diluent. While this is an effective means of lowering the molecular weight and melt viscosity of the polymers, it has the disadvantages of increased cost and inconvenience in separating the polymers from the organic diluent. In another proposed technique, the polymerization is conducted at an elevated temperature. This procedure, which increases the possibility of an uncontrollable or violent polymerization reaction, often results in thermal degradation of the products. Alternatively, polymers of relatively low molecular weight can be prepared by polymerizing a monomer component comprising a vinyl halide in the presence of a molecular weight regulating agent that is, for example, a halogenated hydrocarbons, such as carbon tetrachloride, chloroform, bromoform, dichlorodibromomethane, 1,2-dichloroethylene, trichloroethylene, or perchloroethylene; an organotin compound, such as di-n-butyltin bis-(isooctyl mercaptoacetate); or a mercaptan, such as lauryl mercaptan or ethane dithiol. Some of the previously-used molecular weight regulating agents tend to retard the polymerization reaction, while others require reaction temperatures that are almost as high as those of the aforementioned elevated temperature procedures for regulating molecular weight. In addition, the small amounts of unreacted volatile molecular weight regulating agents, such as trichloroethylene, chloroform, or lauryl mercaptan, that are usually present in the finished product may cause odor and toxicity problems in the work areas in which the polymers are prepared and processed. It would therefore be advantageous to those who work with vinyl halide resins to have available molecular weight regulating agents that are relatively non-volatile and non-toxic and that do not retard the polymerization or require the use of polymerization conditions that result in discoloration or degradation of the polymer.

In accordance with this invention, it has been found that when a monomer component that comprises a vinyl halide is polymerized in an aqueous medium in the presence of a free radical generating polymerization initiator and a molecular weight regulating agent that is an alkylene bis-(mercaptoalkanoate), the polymers obtained have substantially lower molecular weights and melt viscosities than the corresponding polymers prepared at the same temperature but using other molecular weight regulating agents.

The polymers that are prepared by the process of this invention can be readily fused, extruded, or molded in conventional processing equipment without requiring the use of the elevated temperatures that would have a deleterious effect on the polymer strength and color. The novel process is particularly advantageous in that it accomplishes molecular weight reduction without the use of the halogenated hydrocarbons or other volatile molecular weight regulating agents have can cause pollution problems in areas where the polymers are produced and processed.

The alkylene bis-(mercaptoalkanoates) that are used as the molecular weight regulating agent in the process of this invention have the structural formula

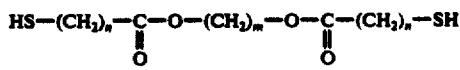

wherein m represents a number in the range of 1 to 6 and each n represents a number in the range of 1 to 3. Illustrative of these compounds are the following: methylene bis-(mercaptoacetate), methylene bis-(3-mercaptopripionate), ethylene bis-(mercaptoacetate), ethylene bis-(3-mercaptopropionate), ethylene bis-(4-mercaptobutyrate), trimethylene bis-(3-mercaptopropionate), tetramethylene bis-(mercaptoacetate), tetramethylene bis-(3-mercaptopropionate), pentamethylene bis-(4-mercaptobutyrate), and hexamethylene bis-(mercaptoacetate). The preferred molecular weight regulating agents have the structural formula

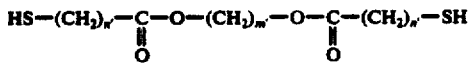

wherein $m'$ is 2, 3, or 4 and each $n'$ is 1 or 2. Examples of the preferred molecular weight regulating agents are ethylene bis-(mercaptoacetate) and ethylene bis-(3-mercaptopropionate). A single alkylene bis-(mercaptoalkanoate) or a mixture of two or more of these compounds can be used in the practice of this invention.

In addition to providing the desired reduction in the molecular weight and melt viscosity of the vinyl halide polymer, these compounds do not retard the polymerization reaction, require the use of elevated polymerization temperatures, or cause pollution problems.

The amount of alkylene bis-(mercaptoalkanoate) that is used in the process of this invention to control the molecular weight of vinyl halide polymers is usually between 0.05 percent by weight and 1.0 percent by weight, based on the weight of the monomer component of the polymerization mixture. Optimum results have been obtained when from 0.1 percent by weight to 0.5 percent by weight of alkylene bis-(mercaptoalkanoate), based on the weight of the monomer component, was used. When less than 0.05 percent by weight is used, there is often insufficient reduction in the molecular weight of the polymer; when more than about 1.0 percent by weight is used, the polymerization reaction may undergo excessive retardation. When the indicated amount of alkylene bis-(mercaptoalkanoate) is used, a substantial reduction in the molecular weight and melt viscosity of the vinyl halide resin is effected without the necessity of altering polymerization conditions and without a significant decrease in the rate of polymerization.

The process of this invention may be used in the production of vinyl halide homopolymers as well as polymers formed by the copolymerization of a vinyl halide with a water-insoluble ethylenically-unsaturated monomer that is copolymerizable therewith. The vinyl halide is ordinarily and preferably vinyl chloride, but the bromide, fluoride, and iodide can also be used. Suitable comonomers include vinyl acetate, vinyl propionate, vinyl stearate, vinyl benzoate, ethylene, propylene, methyl methacrylate, ethyl acrylate, allyl acrylate, acrylamide, acrylonitrile, methacrylonitrile, vinylidene chloride, vinyl ethers, dialkyl fumarates and maleates, and the like. When one or more of the aforementioned comonomers are used, the monomer component contains at least 70 percent by weight of the vinyl halide. It is preferred that the monomer component consist essentially of vinyl chloride or that it contain about 80 percent to 90 percent by weight of vinyl chloride and 10 percent to 20 percent by weight of vinyl acetate.

The polymerization reactions of this invention are carried out in the conventional manner using the well-known emulsion or suspension polymerization techniques. In the suspension polymerization process, a vinyl halide or a mixture of a vinyl halide with at least one comonomer is suspended in water by the use of suspending agents and agitation. The polymerization is started by means of a free radical generating polymerization initiator, such as lauroyl peroxide, benzoyl peroxide, diisopropyl peroxydicarbonate, tertiary butyl peroxypivalate, azobisisobutyronitrile, azobis-2,4-dimethylvaleronitrile, combinations of dialkyl peroxydicarbonates and lauroyl peroxide, sulfonyl peroxides and the like. Suspending agents such as methylcellulose, hydroxymethylcellulose, hydroxyethylcellulose, hydroxypropylmethylcellulose, hydrolyzed polyvinyl acetate, gelatin, methyl vinyl ether-maleic anhydride copolymers and combinations of the above are included in the reaction mixture. In the emulsion polymerization process, vinyl halide homopolymers and copolymers are prepared using such initiators as hydrogen peroxide, organic peroxides, persulfates, and redox systems and such surface-active agents as alkyl sulfates, alkane sulfonates, alkylaryl sulfonates, and fatty acid soaps. The polymerization is usually carried out at a temperature in the range of 40° C. to 80° C. The polymers that are produced may be separated and dried by spray-, drum-, or tray-drying techniques.

The alkylene bis-(mercaptoalkanoate) may be added to the polymerization mixture before the polymerization reaction is begun, or it may be added incrementally or continuously during the course of the reaction.

The relative viscosity of a vinyl halide polymer is gnerally taken as being indicative of its molecular weight since the relative viscosity decreases with decreasing molecular weight. Relative viscosity, which is the ratio of the viscosity of a solution of the polymer to that of the solvent, is usually measured using a 1% solution of the polymer in cyclohexanone at 25° C. in a Canon-Fenske Viscometer.

This invention is further illustrated by the examples that follow:

EXAMPLE 1

A series of polymers was prepared by heating and stirring the polymerization systems set forth in Table I in an autoclave at 65° C. for 10 hours. The polymers were separated by filtration and air dried at 45° C. The relative viscosities of the polymers are given in Table I.

Table I

| Polymerization System (parts by weight) | Example | | Comparative Example | | | |
|---|---|---|---|---|---|---|
| | 1 | 2 | A | B | C | D |
| Vinyl Chloride | 100 | 100 | 100 | 100 | 100 | 100 |
| Deionized Water | 180 | 180 | 180 | 180 | 180 | 180 |
| Lauroyl Peroxide | 0.14 | 0.14 | 0.14 | 0.14 | 0.14 | 0.14 |
| Hydroxymethylcellulose | 0.625 | 0.625 | 0.625 | 0.625 | 0.625 | 0.625 |
| Ethylene bis-(mercaptoacetate) | 0.1 | — | — | — | — | — |
| Ethylene bis-(3-mercaptopropionate) | — | 0.1 | — | — | — | — |
| Chloroform | — | — | 0.8 | — | — | — |
| Dichloroethylene (trans) | — | — | — | 0.8 | — | — |
| Trichloroethylene | — | — | — | — | 0.8 | — |
| Relative Viscosity (1% solution of the polymer in cyclohexanone at 25° C) | 1.74 | 1.76 | 1.84 | 1.80 | 1.74 | 1.84 |

From the data in Table I, it will be seen that when there was 0.1 part by weight of an alkylene bis-(mercaptoalkanoate) in the polymerization mixture, the reduction in the relative viscosity of the polymer was equal to or better than that achieved when 0.8 part by weight of trichloroethylene or one of the other conventional molecular weight regulating agents was used.

EXAMPLE 2

The procedure described in Example 1 was repeated except that varying amounts of ethylene bis-(mercaptoacetate) were added to the polymerization mixture. The amounts of ethylene bis-(mercaptoacetate) that were used, the relative viscosities of the products, and the degree of polymerization of vinyl chloride or polyvinyl chloride are given in Table II.

Table II

| Ex. No. | Parts by wt. of Ethylene bis-(mercaptoacetate) added per 100 parts by wt. of vinyl chloride | Degree of Conversion of Vinyl Chloride PVC (%) | Relative Viscosity of PVC (1% solution of PVC in Cyclohexanone at 25° C.) |
|---|---|---|---|
| 2a | 1.0 | 62.3 | 1.15 |
| 2b | 0.7 | 75.2 | 1.30 |
| 2c | 0.5 | 81.0 | 1.40 |
| 2d | 0.2 | 97.5 | 1.62 |
| 2e | 0.1 | 98.0 | 1.71 |
| 2f | 0.05 | 98.2 | 1.81 |
| 2g | 0 | 96.0 | 1.84 |

The data in Table II demonstrate that from 0.05 percent to 1.0 percent by weight of ethylene bis-(mercaptoacetate) can be used to reduce the viscosity of polyvinyl chloride resins and that the best results are obtained when from 0.1 percent to 0.5 percent by weight of ethylne bis-(mercaptoacetate) is used.

EXAMPLE 3

A polymerication mixture that contained 83 parts by weight of vinyl chloride, 17 parts by weight of vinyl acetate, 185 parts by weight of deionized water, 0.11 part by weight of lauroyl peroxide, 1.75 part by weight of gelatin, and 0.1 part by weight of ethylene bis-(mercaptoacetate) was polymerized in an autoclave at 69° C. for 10 hours. The copolymer was separated by filtration and air dried at 45° C. The relative viscosity of the copolymer produced was 1.50 at 25° C. (1% solution in cyclohexanone).

COMPARATIVE EXAMPLE E

The procedure described in Example 3 was repeated except that 0.8 part by weight of trichloroethylene was used instead of the ethylene bis-(mercaptoacetate) as the molecular weight regulating agent. The relative viscosity of the copolymer produced was 1.50 at 25° C. (1% solution in cyclohexanone).

Comparison of the data in Example 3 with that in Comparative Example E demonstrates that ethylene bis-(mercaptoacetate) is far more effective as a molecular weight regulating agent in the preparation of a vinyl chloride copolymer than trichloroethylene inasmuch as products having the same relative viscosity were obtained when either 0.1 part by weight of ethylene bis-(mercaptoacetate) or 0.8 part by weight of trichloroethylene was used as the molecular weight regulating agent in the polymerization system.

What is claimed is:

1. In the process for the polymerization of a monomer component selected from the group consisting of vinyl halides and mixtures of vinyl halides with at least one ethylenically-unsaturated monomer that is copolymerizable therewith, said mixtures containing at least 70% by weight of vinyl halide, in an aqueous medium at a temperature in the range of 40° C. to 80° C. in the presence of a free-radical generating polymerization initiator, the improvement that consists of conducting the polymerization in the presence of from 0.5 percent to 1.0 percent by weight, based on the weight of the monomer component, of an alkylene bis-(mercaptoalkanoate) having the structural formula

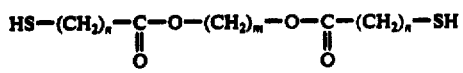

wherein $m$ represents a number in the range of 1 to 6 and each $n$ represents a number in the range of 1 to 3.

2. The process of claim 1 wherein the alkylene bis-(mercaptoalkanoate) has the structural formula

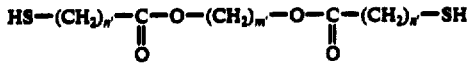

wherein $m'$ is 2, 3, or 4 and each $n'$ is 1 or 2.

3. The process of claim 1 wherein the alkylene bis-(mercaptoalkanoate) is ethylene bis-(mercaptoacetate).

4. The process of claim 1 wherein the alkylene bis-(mercaptoalkanoate) is ethylene bis-(mercaptopropionate).

5. The process of claim 1 wherein the polymerization is conducted in the presence of from 0.1 percent to 0.5 percent by weight, based on the weight of the monomer component.

6. The process of claim 1 wherein the monomer component consists essentially of vinyl chloride.

7. The process of claim 1 wherein the monomer component contains 80 percent to 90 percent by weight of vinyl chloride and 10 percent to 20 percent by weight of vinyl acetate.

* * * * *